Feb. 17, 1942.   N. M. COUTY   2,273,395

UNIVERSAL TUBING FITTING

Filed Jan. 31, 1941

INVENTOR
Norman M. Couty.
BY
ATTORNEY

Patented Feb. 17, 1942

2,273,395

UNITED STATES PATENT OFFICE 2,273,395

UNIVERSAL TUBING FITTING

Norman M. Couty, Detroit, Mich., assignor to The Flex-O-Tube Company, a corporation of Delaware Application January 31, 1941, Serial No. 376,736

2 Claims. (Cl. 285—90)

This invention relates to flexible connections for tubing and in particular to means for providing non-rigid pressure tight connections between relatively rigid tubing and the like.

This application for patent is a continuation in part of a previous application by the same inventor filed May 1, 1939, Serial No. 271,048, which has matured into Patent No. 2,236,967 dated April 1, 1941.

In automotive, aircraft, and other types of power plant installations it is necessary to employ tubing and the like for the purpose of conveying fuels, lubricant and coolant from tanks, reservoirs and coolers to the power plant and between the various component elements of the power plant. Severe and continuous vibrational movement generally exists between the various component elements and units of power plants. Flexible tubing or more or less rigid tubing with which non-rigid connections are generally employed are used to connect the various units of the fuel, lubricating and cooling systems of automotive, aircraft and marine power plants and in other instances where vibration is likely to cause structural and hydraulic failures of lines employed to carry fluids. When semi-rigid tubing or rigid tubing is employed, a suitable flexible connection is required to prevent structural and hydraulic failure of the tubing at the connecting means.

The main object of this invention is to provide a highly efficient non-rigid connection for relatively rigid tubing and the like employed to connect together the members of a hydraulic system which will permit vibrational motion therebetween without structural or hydraulic failure.

Another object of the invention is to provide a non-rigid connection between relatively rigid tubing and the like which is extremely simple in construction, which will resist and absorb vibration without structural failure, and which affords a permanent and positive fluid-tight seal.

Another object of the invention is to provide a non-rigid connection for relatively rigid tubing and the like which will permit the said tubing to vibrate freely without danger of crystallization and rupture, and, at the same time, assure a permanent and positive fluid-tight seal.

Other objects of the invention will become apparent by reference to the following detailed description taken in connection with the accompanying drawing, in which.

Figure 1:
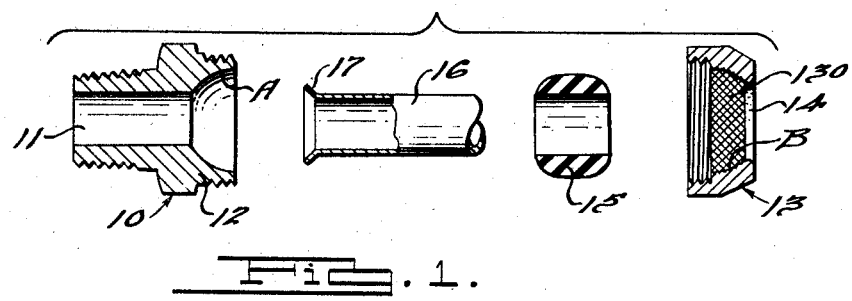
Fig. 1 is an exploded sectional view of a flexible connection for tubing embodying the invention.

Referring now to the drawing wherein like numerals refer to like and corresponding parts throughout the several views, the illustrative embodiment of the invention disclosed in the drawing is shown in conjunction with a male externally threaded pipe fitting, however, it is to be understood that the invention may be used with and applied to various other types of pipe fittings and couplings as may be desired or required.

Figure 2:
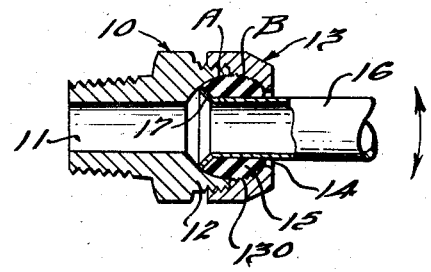
Fig. 2 is a longitudinal sectional view of the flexible tubing connection disclosed in Fig. 1.

Referring now particularly to Figs. 1 and 2, the illustrative embodiment of the invention disclosed therein comprises an externally threaded male pipe fitting 10 provided with an axial bore 11 therethrough terminating in an axially disposed frusto-spherical counterbore A formed in the enlarged externally threaded end 12 of the said male pipe fitting 10. The frusto-spherical counterbore A is formed smooth and cooperates with a frusto-spherical counterbore B formed within an internally threaded nut 13 having a bore 14 through the outer end thereof to form a spherical socket A—B. The inside of the frusto-spherical counterbore B of the nut 13 is preferably knurled or otherwise deformed as indicated by the numeral 130 in the drawing for the purpose hereinafter described.

A relatively stiff yet resilient annular washer 15 of rubber, neoprene, duprene or the like is formed to a shape such as indicated in Fig. 1 with an internal diameter approximately the same and preferably slightly less than the external diameter of the flared tubing 16 and slightly longer than the total length of the distance from the flared end 17 of the flared tubing 16 to the inner edge of the bore 14 of the internally threaded nut 13 when assembled as indicated in Fig. 2. The outer diameter of the said annular washer is preferably approximately the same or slightly larger than the greatest diameter of the frusto-spherical counterbores A and B of the fitting 10 and nut 13 respectively.

The annular washer 15 is first telescoped over the flared tube 16 and urged against the flare 17 at the end thereof. The flared tube is then telescoped through the bore 14 at the outer end of the nut 13 and the nut 13 is threaded on the externally threaded end 12 of the pipe fitting 10. The tightening of the nut 13 on the enlarged externally threaded end 12 of the fitting 10 compresses the annular washer 15 to the position indicated in Fig. 2, the portion of the outer surface of the washer 15 which is compressed in contact with the knurled frusto-spherical counterbore B of the nut 13 becomes fixed with respect to the said knurled frusto-spherical counterbore B.

Figure 3:
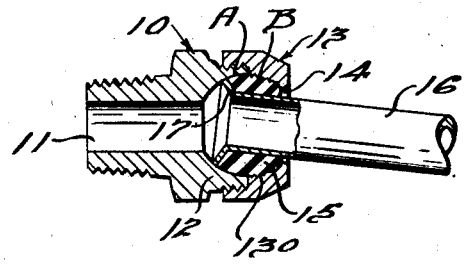
Fig. 3 is a longitudinal sectional view of the flexible tubing connection disclosed in Figs. 1 and 2 showing the tubing in an extreme flexed position.

Thus, the invention provides a ball and socket connection between a flared tube 16 and a pipe fitting 10 having a nut 13 thereon which cooperates with the fitting 10 to make a spherical socket A—B into which a washer 15 serves as a ball, all to permit the flared tube 16 to flex and vibrate with universal movement with respect to the pipe fitting 10. When the said flared tube 16 flexes with respect to the pipe fitting 10 as indicated in Fig. 3, the inner end of the annular washer 15 compresses and expands while the outer end thereof opposite the knurled portion B of the spherical socket A—B is immovable. This prevents the outer end of the annular washer 15 from working itself out through the bore 14 of the nut 13 between the said nut 13 and the flared tube 16 during the universal flexing or vibration of the flared tube 16 with respect to the fitting 10.

Although but one embodiment of the invention has been disclosed and described in detail, it will be understood that various changes including the size, shape, arrangement and detail of the parts thereof may be made without departing from the spirit of the invention, and it is not intended to limit the scope of the invention other than by the terms of the appended claims.

I claim:

1. A flexible connection for flared end tubing comprising a coupling member and nut each bored and semi-spherically counterbored to form when threaded together a spherical socket which accommodates the flared end of a flared end tubing, and a resilient annular washer telescoped over said tubing pressed within said spherical socket in sealed relationship between the flared end of said tubing and said socket forming a resilient ball member which provides for flexing of the said tubing with respect to the said coupling member.

2. A flexible connection for flared end tubing comprising a coupling member and nut each bored and semi-spherically counterbored to form when threaded together a spherical socket which accommodates the flared end of a flared end tubing, and a resilient annular washer telescoped over said tubing pressed within said spherical socket in sealed relationship between the flared end of said tubing and said socket forming a resilient ball member which provides for flexing of the said tubing with respect to the said coupling member, the surface of the said semi-spherically counterbored portion of the said nut being roughened to prevent sliding of the said washer with respect to the said nut during the flexing of the said tubing.

NORMAN M. COUTY.